June 14, 1960 A. M. THOMPSON 2,941,098
PORTABLE TOOL ASSEMBLY
Filed Aug. 4, 1958
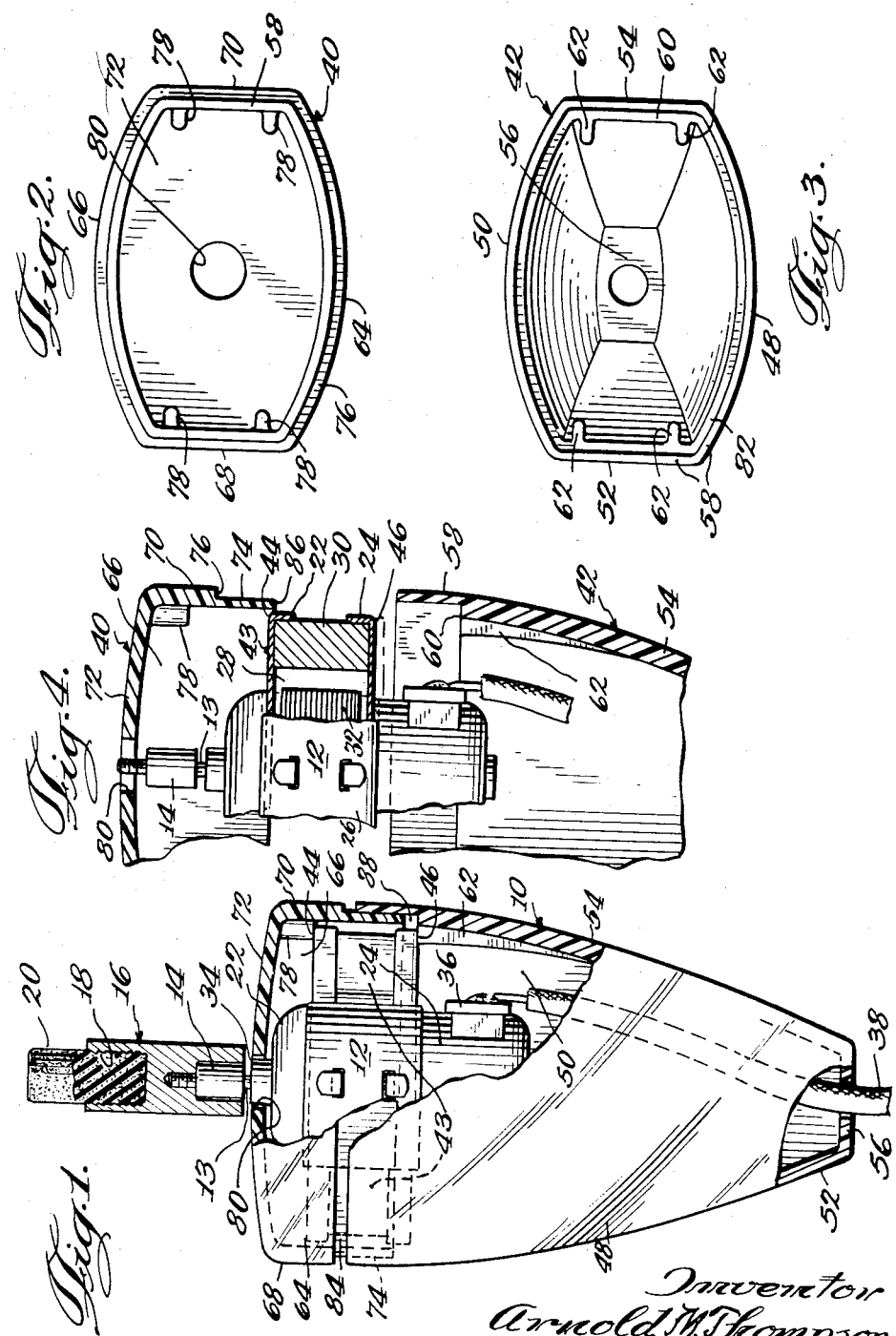
Inventor
Arnold M. Thompson
By Norman Gerlach
Attorney

United States Patent Office 2,941,098
Patented June 14, 1960

2,941,098

PORTABLE TOOL ASSEMBLY

Arnold M. Thompson, Wheaton, Ill., assignor to Thompson Tool and Manufacturing Co., Franklin Park, Ill., a corporation of Illinois Filed Aug. 4, 1958, Ser. No. 752,824

1 Claim. (Cl. 310—50)

The present invention relates to portable tool assemblies and has particular reference to a small electric motor and housing therefor which, when assembled as a unit, may be useful as a hand tool for performing a wide variety of useful work. The tool assembly of the present invention has been designed for use primarily as an electrically powered implement capable of association with a utility cabinet of the type shown and described in my United States Patent No. 2,861,578, dated November 25, 1958, for Utility Cabinet and wherein there is disclosed an electrically powered manicure implement and a portable carrying cabinet or case therefor and in which case there is stored an electrical power supply for the implement, together with control means whereby the power supply may, at will, be operatively connected to the implement to operate the same. As set forth in such application, the tool assembly disclosed therein is capable of other uses and, similarly, in the present instance, the improved tool assembly may be designed to perform a wide variety of useful work. For example, the assembly may be designed as an electric eraser implement for use by architects and draftsmen or as a buffing implement, woodworking scribe or other implement having a rotary output shaft to which a wide variety of abrading or cutting tools may be applied. Irrespective however of the particular use to which the present invention may be put, the essential features thereof are at all times preserved.

At the present time there are available on the market a wide variety of small inexpensive electric motors of the low voltage direct current type. These motors, most of which are of Japanese origin, have a voltage rating of either 1½ or 3 volts, are designed to be operated by a single cell flashlight battery or by two such batteries, are extremely light and compact, and cost but a few cents each. Such motors have found wide application as power units for novelty items such as animated toys, toy vehicles and portable hand tools. Structurally, these motor units are extremely simple in design and construction and consist of a permanent field magnet and a rotary armature held in operative relation to each other by light sheet metal stampings which provide the motor casing, as well as the journal bearings for the armature shaft. The casing parts are crimped around the field magnet and are interlocked by means of tongue and slot connections, the entire assembly being devoid of clamping bolts or other threaded parts.

Electric motors of this type depend for their low cost on mass production methods and, as a result thereof, wide manufacturing tolerances obtain, not only among motors of similar design and different origin but among motors of common origin issuing from the same dies and of the same metal stock. Such motors make no provision for assembly or attachment in the ultimate articles with which they are to be associated and invariably it is up to manufacturing consumer to design his novelty item around the shape of the motor so that the motor may be securely anchored in operative position within or with respect to the article. The cost of drilling and tapping the field magnet for bolt-anchoring purposes is not only costly but it weakens the strength of the magnetic field and, usually the sheet metal motor casing is incapable of withstanding drilling and tapping operations. Sometimes the motor is glued or cemented in position but this involves a period of drying time which raises the cost of the item, and also results in a bond which is frequently broken during shipment or as an incident to rough usage. Spring hold-down clips and the like are sometimes employed for motor anchoring purposes but these are costly and the anchoring of the clips themselves presents a problem. Where the design of the casing of the toy or other novelty item with which the motor is to be employed is made to conform to the shape of the electric motor so that when the item is assembled the motor will be fixedly confined within the casing, manufacturing tolerances in the construction of the motor result in a large number of rejects or, alternately, in the production of defective articles wherein the motor is either loose within the article housing or wherein the housing is left with open seams or other ill fitting parts.

The present invention is designed to overcome the above-noted limitations that are attendant upon the wide manufacturing tolerances which are prevalent in connection with small low voltage electric motors of the character briefly outlined above in connection with their use as power units for novelty items and, toward this end, the invention contemplates the provision of a two-piece motor housing including a body part and a closure part or cap, the two parts having associated therewith cooperating clamping means which, when the parts are assembled upon each other, will securely and permanently engage opposite sides of the motor unit at multiple spaced regions and anchor the motor fixedly within the casing against dislodgment, the clamping means being so constructed that it will accommodate motors the dimensions of which very widely, due either to wide manufacturing tolerances of motors of similar but varying basic design, i.e. motors obtained from different sources.

The provision of an electric motor and housing assembly of the character set forth above being among the principal objects of the invention, a further object is to provide a motor and housing unit which, although the shape characteristics or dimensions of the various motors over a given production run may vary appreciably, the design of the housing is such that when a number of the housings have been assembled on such motors, the respective parts of each housing will fit together perfectly, will present no appreciable or discernible difference in its size or shape characteristics from its companion housings, will be devoid of open seams, and will effectively maintain the motor fixedly in the assembly against dislodgment.

Other objects and advantages of the invention, not at this time enumerated, will become more readily apparent as the nature of the invention is better understood.

In the accompanying single sheet of drawings forming a part of this specification a preferred embodiment of the invention has been shown.

In these drawings:

Fig. 1 is a front elevational view of an electric motor assembly constructed in accordance with the principles of the present invention;

Fig. 2 is an end elevational view directed into the interior of a closure cap employed as one element of the motor casing of the assembly of Fig. 1;

Fig. 3 is an end elevational view directed into the interior of the body portion of the motor casing of the assembly of Fig. 1; and Fig. 4 is an enlarged expanded view, partly in section, of a fragment of the motor assembly and illustrating the manner in which the motor casing will accommodate electric motors which vary in their manufacturing tolerances.

Referring now to the drawings in detail, an assembled portable tool unit constructed in accordance with the principles of the present invention has been designated in its entirety at 10 and, for exemplary purposes, has been shown in the form of an eraser implement of the type employed by architects and draftsmen. The unit 10 involves in its general organization an electric motor assembly or unit 12 having a motor shaft 13 carrying a threaded fitting 14 over which there is threadedly received an eraser chuck 16 having a socket 18 formed in an end thereof and designed for frictional and removable reception therein of a cylindrical abrasive eraser element 20.

The motor assembly 12 is purely conventional in its design and no claim is made herein to any novelty associated with the same, the novelty of the present invention residing rather in the nature of the housing assembly within which the motor assembly is installed to produce the unit 10 and which housing assembly will be described in detail presently. Briefly, the motor assembly 12 comprises a motor casing including upper and lower cup-shaped casing shells 22 and 24 respectively (Fig. 4), side wall sections 26 and 28, opposed field magnets, one of which appears at 30, and an armature 32 which is mounted on the motor shaft 14. The shaft 14 is rotatably journalled in bearings 34 provided by the casing shells 22 and 24. The motor assembly 12 is further provided with the usual commutator, brushes and the like (not shown). A terminal plate 36 is mounted on the shell 24 for electrical lead-in purposes and receives the ends of a dual-conductor lead-in cable 38.

The motor assembly 12 is operatively and fixedly clamped in position within a two-part separable portable housing assembly including an upper closure cap part 40 and a lower body part 42. It is to be noted that the previously described motor assembly 12 is so designed as to present a pair of laterally extending projections 43 which are defined by the two oppositely disposed field magnets 30 and the portions of the housing shells 22 and 24 between which these magnets are interposed. The two projections, thus defined, afford oppositely facing shoulders 44 and 46 respectively designed for engagement with portions of the closure cap and body parts 40 and 42 respectively of the motor casing when the latter are assembled upon the motor unit 12.

Referring now to Figs. 3 and 4, the body part 42 of the housing assembly for the motor casing is of relatively deep cup-shape design and has an approximate frustopyramidal form including relatively wide side walls 48 and 50, relatively narrow end walls 52 and 54, and a generally rectangular bottom wall 56 of small dimensions. The upper rim portion of the body part 42 is of reduced thickness as indicated at 58, which is to say that the various side and end walls are relatively thin in this region, thus providing a continuous internal upwardly facing shoulder 60. Formed internally on the end walls 52 and 54 immediately below the reduced portions 58 thereof are respective pairs of spaced, vertically extending clamping ribs 62. The upper ends of the individual ribs 62 terminate flush with the shoulder 60 as best seen in Fig. 4 and the lower ends of the ribs merge uniformly into the contour of the inner surface of the end walls 52 and 54. The ribs 62, in combination with similar ribs provided on the closure part 40, are adapted to perform certain motor-clamping and anchoring functions which will be described in detail subsequently.

Referring to Figs. 2 and 4, the closure part 40 is of inverted cup-shape design and is narrower in one transverse direction than it is in the other direction, thus rendering the housing as a whole generally flat with expansive lateral sides and narrow end sides. The part 40 includes depending side walls 64 and 66, depending end walls 68 and 70, and a dome-shaped top wall 72 of long radius of curvature. The lower rim portion of the part 40 is of reduced thickness as indicated at 74, which is to say that the various side and end walls are relatively thin in this region, thus providing a continuous external downwardly facing shoulder 76. The reduced rim portion 74 is shaped conformably to the reduced rim portion 58 of the body part 42 so that the two parts may be assembled by telescopically fitting the rim portion 74 within the rim portion 58 as shown in Fig. 1. Formed internally on the end walls 68 and 70 immediately above the reduced portions 74 thereof are respective pairs of spaced, vertically extending clamping ribs 78. The lower ends of the ribs 78 terminate flush with the shoulder 76. The ribs 78 are designed for clamping cooperation with the ribs 62 on the body part 42 in clamping certain portions of the motor assembly 12 therebetween when the various parts of the unit 10 are assembled.

Accordingly, the spacing of the ribs 78 on the inside face of the end walls 68 and 70 is identical with the spacing of the ribs 62 on the inside face of the end walls 52 and 54 so that when the parts 40 and 42 are assembled, the ribs 78 are vertically aligned with corresponding ribs 62. The distance between the two ribs 62 on each end wall 52 and 54 is slightly less than the width of the lateral protuberances 43. Furthermore, the radial extent of the motor unit 12, i.e. the overall radial extent of the two projections 43 is slightly less than the distance between the end walls 52 and 54 in the rim regions thereof but is greater than the distance between the opposed ribs 62 on the end walls so that the motor unit 12 as a whole may be caused to rest upon the four ribs 62 when the pyramidal body part 42 is in the upright position in which it is shown in Figs. 1 and 4. With the motor unit 12 thus positioned so as to rest upon the upper ends of the four vertically extending ribs 78 of the body part 42, the closure part 40 may be telescopically fitted to the body part as indicated by the arrow in Fig. 4. To accommodate the motor shaft 13 and fitting 14, the top wall is formed with a circular central opening 80 therethrough. As the closure part 40 is moved downwardly into interfitting telescopic relation relative to the body part 42, the lower ends of the four ribs 74 move into clamping engagement with the shoulder portion 44 of the motor unit 12 while at the same time the upper ends of the ribs 62 remain in engagement with the shoulder portion 46 of the unit 12. Whether the assembly be made manually or by machine operations, pressure is applied to the two parts 40 and 42 tending to maintain the motor unit 12 thus clamped between the ribs 62 and 78 while at the same time the two parts may be cemented or otherwise secured to each other to complete the assembly of the implement 10. Finally, the eraser chuck 16 or other tool proper may be threaded onto the motor shaft 13.

While the casing parts 40 and 42 may, if desired, be formed of metal, it is preferably formed of a suitable plastic material such as ethylene polymer or the like. In such an instance the two casing parts 40 and 42 may be secured together in their clamping relationship relative to the motor unit 10 by the application of a suitable adhesive or a solvent to the mating faces of the telescopic parts 74 and 58. Clamping pressure need be maintained for but a brief interval of time while the adhesive hardens or the solvent solidifies. If the casing be made of metal, soldering or spot welding operations may be resorted to.

Referring now to Fig. 4, it will be observed that with the particular motor unit 10 illustrated herein and shown in full lines, when the assembly is made as described above, the downwardly facing shoulder 76 of the casing part 40 does not meet the upwardly facing rim 82 of the casing part 42 and a continuous circumferential groove-like gap exists as at 84 (Fig. 1) externally of the assembled casing structure. Furthermore, the lower rim 86 of the casing part 40 does not meet the opposed shoulder 60 so that a similar internal groove-like gap 88 exists within the casing structure. The width of these two gaps 84 and 88 will vary among different installations according to the manufacturing tolerances encountered in connection with various motor units 12 but in every instance, even where extreme tolerances are encountered, the motor 12 will be securely clamped in position within the casing against dislodgment. The greater the distance between the two shoulders 44 and 46 on the motor casing, the wider will be the gap 84 and the narrower will be the gap 88. Conversely, the lesser the distance between the shoulders 44 and 46, the narrower will be the gap 84 and the wider will be the gap 88.

The invention is not to be limited to the exact arrangement of parts shown in the accompanying drawings or described in this specification since various changes in the details of construction may be resorted to without departing from the spirit of the invention. Only insofar as the invention has particularly been pointed out in the accompanying claim is the same to be limited.

Having thus described the invention what I claim as new and desire to secure by Letters Patent is:

In a rotary tool implement, the combination with an electric motor having a motor casing from which there projects endwise a rotatable motor shaft adapted to receive thereon a tool proper, said casing being provided with a pair of radially extending oppositely directed projections thereon, each embodying a motor field magnet, said projections each presenting oppositely facing longitudinally spaced external upper and lower shoulders respectively, of a two-part portable motor housing for said motor casing including a body part and a closure part, each of said parts being formed entirely of an insulating plastic material, said body part being of tapering generally pyramidal configuration having opposed side and end walls respectively which, in the main, are of uniform thickness and which present an open continuous rim, a limited upper rim region of said body part being of reduced thickness and presenting an internal continuous upwardly facing shoulder immediately below said rim region, said closure part being of inverted cup-shape configuration and having opposed side and end walls respectively which, in the main, are of uniform thickness and which present an open continuous rim, a limited lower rim region of said closure part being of reduced thickness and presenting an internal continuous downwardly facing shoulder immediately above said lower rim region, the lower rim region of reduced thickness of the cover part being snugly and telescopically received within the upper rim region of reduced thickness of the body part with said open continuous rim of the closure part opposing the upwardly facing shoulder of the body part and with the open continuous rim of the body part opposing the downwardly facing shoulder of the closure part, the end walls of said body part each being formed with a pair of spaced integral internal vertically disposed ribs, the upper ends of said ribs terminating in the common horizontal plane of the upwardly facing shoulder on the body part and serving to receive thereagainst the lower shoulders of the projections on said motor casing, the end walls of said closure part each being formed with a pair of spaced integral internal vertically disposed ribs, said latter ribs being in vertical alignment with the respective vertically disposed ribs on the end walls of the body part, the lower ends of said ribs bearing against the upper shoulders respectively on the projections of said motor casing and, in combination with the ribs on the body part, serving to clamp the motor casing in position within the motor unit housing, and an adhesive permanently securing the portions of reduced thickness of the two housing parts together.

References Cited in the file of this patent

UNITED STATES PATENTS

| | | |
|---|---|---|
| 1,852,829 | Welch | Apr. 5, 1932 |
| 2,861,578 | Thompson | Nov. 25, 1958 |